H. J. LEWIS.
WELDING MACHINE.
APPLICATION FILED OCT. 3, 1918.
1,301,462.
Patented Apr. 22, 1919.
5 SHEETS—SHEET 2.
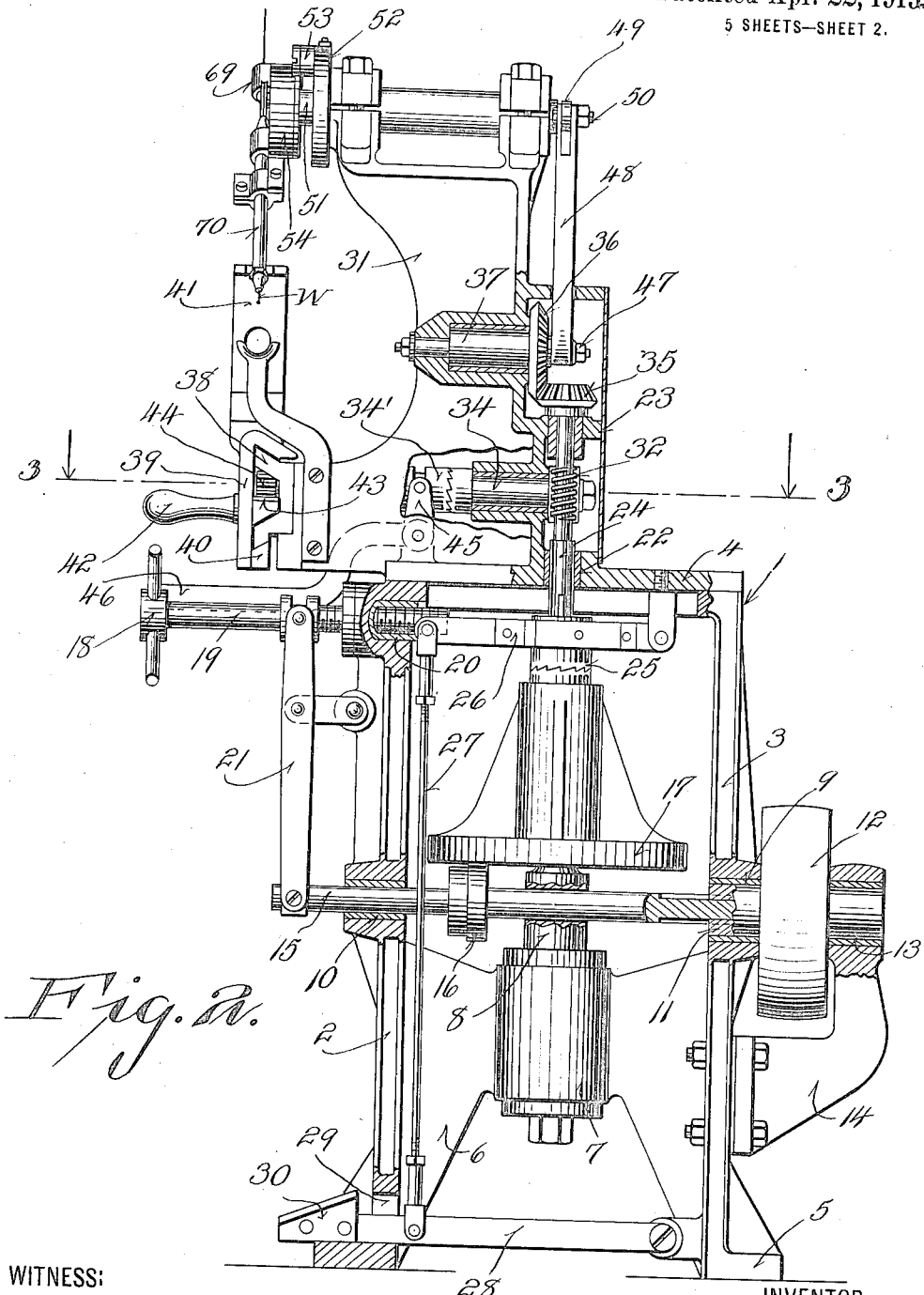
Fig. 2.
WITNESS:
J. F. Britt
INVENTOR
Henry J. Lewis
BY 
ATTORNEY

H. J. LEWIS.
WELDING MACHINE.
APPLICATION FILED OCT. 3, 1918.

1,301,462.

Patented Apr. 22, 1919.
5 SHEETS—SHEET 4.

WITNESS:
J. P. Britt

INVENTOR
Henry J. Lewis
BY
Geo. S. Young
ATTORNEY

H. J. LEWIS.
WELDING MACHINE.
APPLICATION FILED OCT. 3, 1918.
1,301,462.
Patented Apr. 22, 1919.
5 SHEETS—SHEET 5.
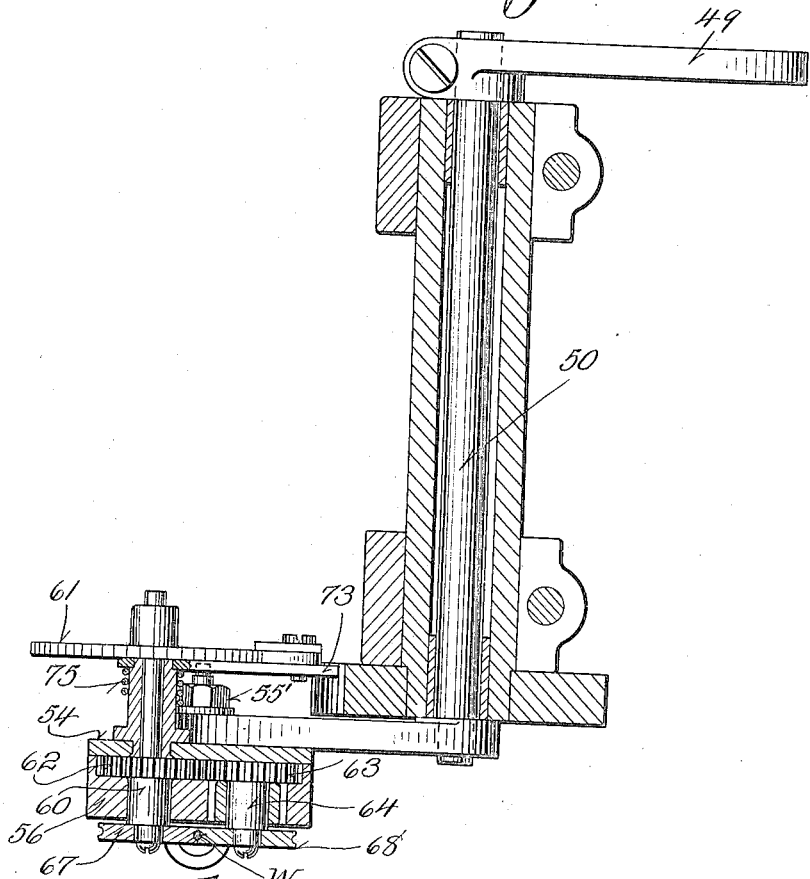
WITNESS:
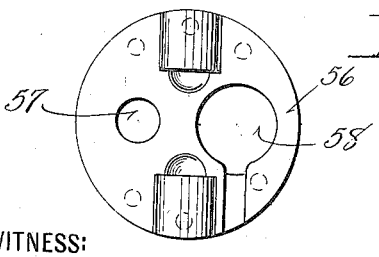
INVENTOR
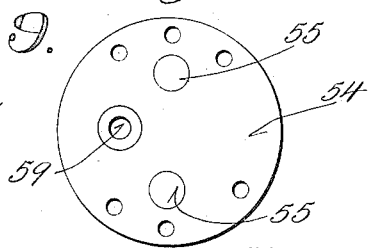
ATTORNEY

UNITED STATES PATENT OFFICE.

HENRY J. LEWIS, OF MILWAUKEE, WISCONSIN, ASSIGNOR TO HARLEY-DAVIDSON MOTOR COMPANY, OF MILWAUKEE, WISCONSIN.

WELDING-MACHINE.

1,301,462.  Specification of Letters Patent.  Patented Apr. 22, 1919.

Application filed October 3, 1918. Serial No. 256,680.

*To all whom it may concern:*

Be it known that I, HENRY J. LEWIS, a citizen of the United States, and resident of Milwaukee, in the county of Milwaukee and State of Wisconsin, have invented certain new and useful Improvements in Welding-Machines; and I do hereby declare that the following is a full, clear, and exact description thereof.

My invention relates to new and useful improvements in machines for mechanically welding, brazing or soldering metallic bars, tubes and the like, and is particularly adapted for use in the brazing of the seams of tubing for use in the formation of motorcycle and bicycle frames.

Previous to the perfection of this machine the brazing of such parts was relatively slow inasmuch as the operation was largely manual. Furthermore the uniformity with which the brazing was carried out rested largely with the skill of the mechanic. Therefore it is the particular object of the present invention to provide a machine for performing mechanically the operations which heretofore were necessarily done manually.

A further object is to provide such a machine in which the work will be uniformly brazed throughout the continuance of the operation.

A specific object of the invention is to provide means for feeding a wire of soldering material or the like at a uniform predetermined rate into the path of the flame from a torch.

With these and other objects and advantages in view the invention resides in the novel features of construction, combination and arrangement of parts which will be hereinafter more particularly described and claimed and shown in the drawings wherein:

Fig. 2 is a substantially vertical transverse sectional view through the machine illustrated in Fig. 1.

Fig. 6 is a section taken substantially on the plane of the line 6—6 of Fig. 4, and Figs. 7, 8 and 9 are detail views of other parts of the wire feeding mechanism.

Figure 1:
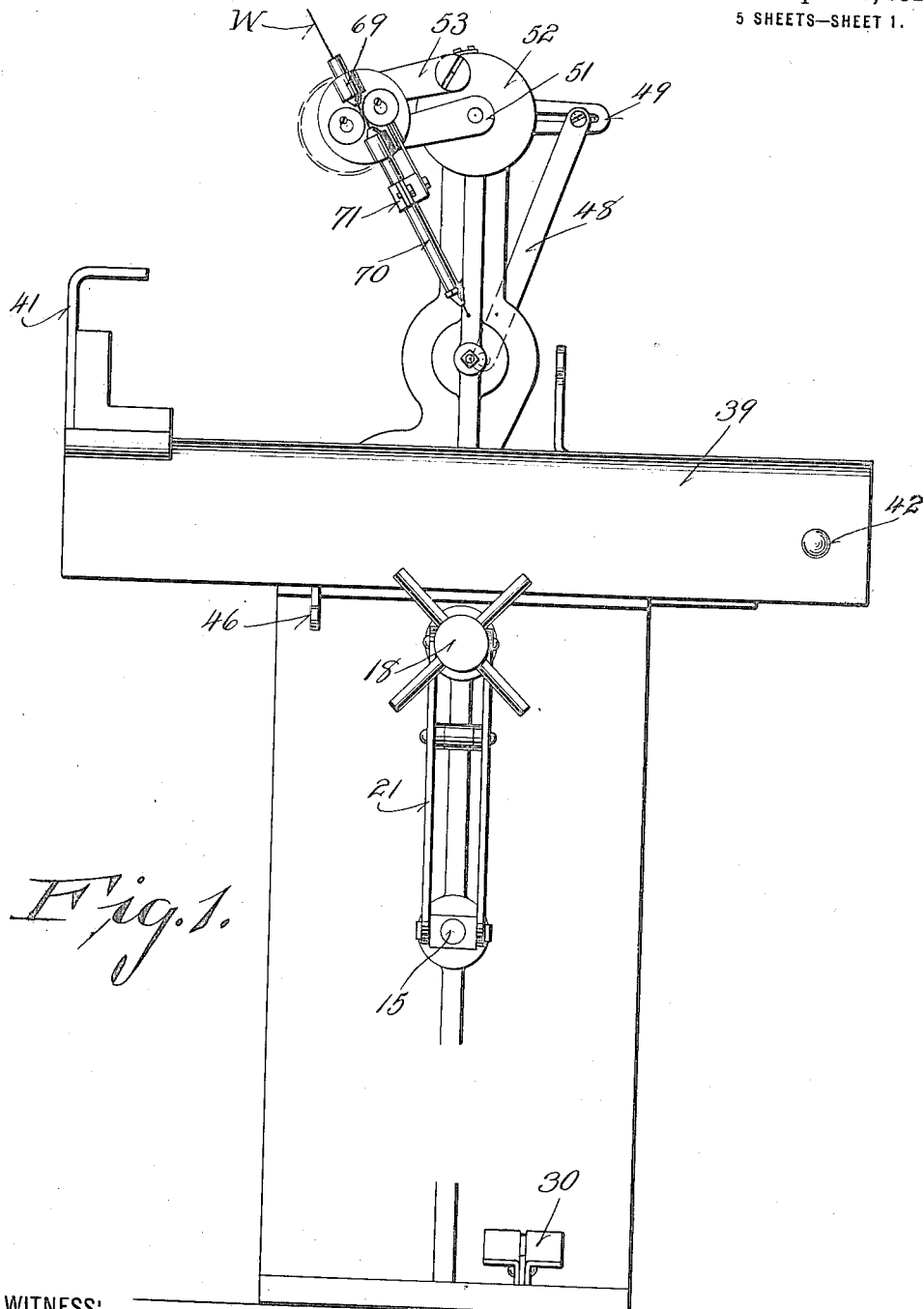
Figure 1 represents a front elevational view of a machine constructed in accordance with the invention.

In the accompanying drawings wherein similar reference characters indicate like parts throughout the views, the numeral 1 denotes a supporting base having front and rear walls 2 and 3 respectively and a top 4 which is disposed a considerable distance above the feet 5 which are formed on the bottom of the walls 2 and 3. The lower portions of these walls 2 and 3 are connected by webs 6, the inner edges of which are joined with a central vertical sleeve 7; a bearing standard 8 is adapted to be mounted in said sleeve 7 and to extend upwardly thereabove.

The front and rear walls 2 and 3 respectively also have a pair of horizontally alined bearings 9 and 10, in the former of which the tubular trunnion 11 of a pulley 12 is journaled, the other trunnion thereof being similarly mounted in a bearing 13 carried by a bracket 14, said bracket being fixed to the rear wall 3. The bearing 13 slidably and rotatably receives a main drive shaft 15 whose rear end is slidably splined in said tubular trunnion.

The intermediate portion of the drive shaft 15 has a friction gear 16 secured thereon which is designed to coöperate with one face of a friction transmission disk or plate 17, the same being journaled on the above referred to bearing standard 8. As is usual in transmission devices of this character, the friction gear 16 is adapted to be moved radially of the plate 17 and toward and away from its center. This adjustment of the two parts of the drive shaft is readily procured by the rotation of a hand wheel 18 carried by the outer end of an adjusting screw 19 which is threadedly disposed in a socket 20 in the front wall 2 of the supporting base adjacent the top 4 thereof. A pair of intermediately pivoted levers 21 having their opposite ends attached to the shaft 15 and adjusting screw 19 form a connection between these elements.

Journaled in a bearing 22 formed centrally of the table 4 and in a bearing carried by a gear housing 23 is a vertical drive shaft 24, the lower end of the same being extended below the bearing 22 and provided with the shiftable element of a toothed clutch 25. The non-shiftable part of the clutch is fixed to the bearing sleeve of the friction plate 17, and the shiftable element is carried by a lever 26 pivoted to the under side of the table 4 and having a connecting rod 27 pivoted at its free end. The lower end of this rod is connected intermediate the ends of a foot lever 28, the same being located at the lower portion of the supporting base 1 and having its free end projected through an opening 29 in the wall 2 thereof; this projecting end carries a foot pedal 30 which is actuated by the operator of the machine for retaining the clutch 25 in connected position. In Fig. 2 the parts are illustrated in this position, it being understood that when the pedal is released that a spring located within the clutch 25 forces the shiftable element thereof away from the other element.

The hereinbefore mentioned gear housing 23 is constructed in the present invention as a part of a vertical support 31 carried by the table 4. The vertical drive shaft 24 between its bearings is provided with a worm 32 which is in mesh with the teeth of a worm gear 33 carried by one end of a clutch controlled horizontal drive shaft 34, said shaft being journaled in bearings formed in or carried by said support 31. The upper end of the vertical drive shaft 24 has a beveled gear 35 fixed thereto, the teeth of which mesh with a second beveled gear 36, the latter being journaled on a stub shaft 37. The rotation of the gear 36 causes the actuation of mechanism to be hereinafter more particularly described.

Also carried by the support 31 and disposed at the front of the machine is a horizontally positioned, dove-tailed carriage track 38 on which a work holding carriage 39 is designed to slide. This carriage is in the form of an elongated plate having its upper edge extended laterally and inwardly and a retaining strip 40 secured to the other edge whereby to procure a dove-tailed groove to receive the dove-tail track. A work positioning member 41 is locked at one end of the carriage 39, and at the other a handle 42 is formed whereby the same may be manually shifted longitudinally and transversely across the front of the machine.

Figure 3:
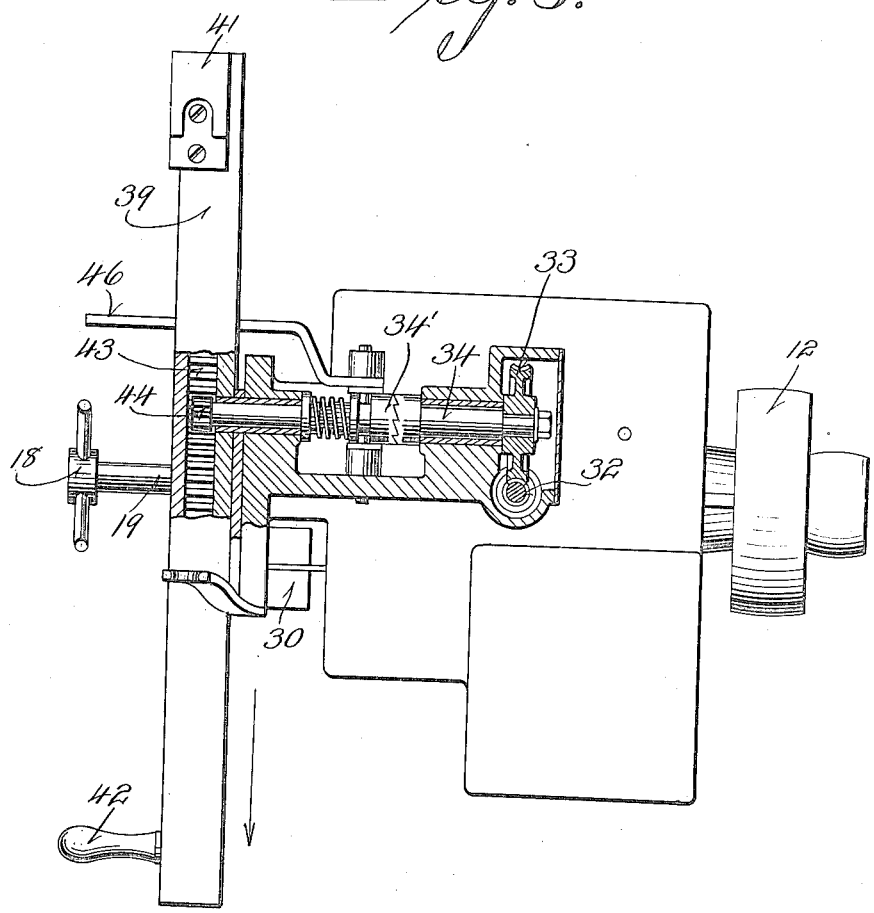
Fig. 3 is a horizontal section taken substantially on the plane of the line 3—3 of Fig. 2.

A rack bar 43 is secured to the inner face of the carriage 39 midway between its edges and is extended longitudinally. The teeth of this rack are meshed with the teeth of a pinion 44, the same being fixed to the outer end of the shaft 34. Thus it will be seen that when the clutches 25 and 34' are in active position the carriage 39 will be shifted in the direction of the arrow in Fig. 3. This movement may readily be discontinued by opening either of the clutches, the clutch 34' being controlled by a bell crank lever 45, one arm of which projects forwardly toward the operator and is fashioned into a handle 46.

Referring now to the mechanism controlled by the revolution of the beveled gear 36, it will be seen that the latter has a crank pin 47 projected therefrom with which one end of a pitman 48 is pivoted, the other end of said pitman being adjustably connected with a crank 49, the latter in turn being fixed to the rear end of a rock shaft 50. This shaft is journaled in bearings carried by the extreme upper end of the support 31, and its front end has a crank arm 51 fixed thereto. This crank arm is adapted to slide over the outer face of a stationary plate 52 to which is pivoted a rocker arm 53, the point of pivotal connection between the same being spaced from the axis of the rock shaft 50.

A disk carrying plate 54 is pivotally connected with the free ends of the arms 51 and 53, said plate having rearwardly extending pivot pins 55 for this purpose, the centers of such pins being preferably spaced apart a distance equal to the space between the centers of the rock shaft 50 and the pivotal connection between the arm 53 and the plate 52. Thus when the crank arm 51 is oscillated by the rocking of the shaft 50, it will be seen that the disk carrying plate 54 will be alternately moved in opposite directions and at the same time slightly oscillated. Fixed to the plate 54 is an outer plate 56 of substantially the same configuration, the same having a pair of spaced openings 57 and 58, the former of which is considerable smaller than the latter and is alined with an opening 59 in the first mentioned plate 54. These alined openings 57 and 59 form a bearing for a shaft 60, the rear end of which is extended beyond the plate 54 and has a ratchet wheel 61 fixed thereto.

The inner face of the outer plate 56 is recessed to provide a housing for a pair of spur gears 62 and 63, the former being carried by the shaft 60, whereas the latter has a hub 64 journally mounted in a bearing 65 formed on the upper end of a flexible gear carrying rod 66, said bearing 65 being located within the large opening 58 in which it has a limited play. A feeding disk 67 is secured to the outer end of the shaft 60 and is adapted to coöperate with a second feeding disk 68 fixed to the hub 64, the peripheries of these disks being serrated to grippingly engage a wire of soldering material or the like W. This wire W is operatively directed and held in correct position on each side of the disks 67 and 68 by guides 69 and 70, the latter being in the form of a downwardly extending tube. The lower end of the rod 66 is attached to this tube 70 by a bracket 71 as clearly shown in Figs. 1 and 4.

The ratchet wheel 61 above referred to has teeth formed in its periphery with which a pawl 72 co-acts, said pawl being pivoted adjacent the free end of a pawl carrying lever 73, the same being rotatable on a sleeve 74 which surrounds the rear end portion of the shaft 60. A spring 75, having one end engaged with the lever 73 and the other with the retaining nut 55' of the crank arm 51, normally urges the former in a direction to cause the pawl 72 to ride over said teeth of the ratchet wheel; movement of the lever 73 is, however, limited by the engagement of a finger 76 with one of the pivot pins 55. The free end of the lever 73 is designed to be intermittently engaged with an actuating finger 77 which is carried by the stationary plate 52, the contact between these two parts being brought about by the shifting of the disk carrying plate 56 and the elements connected therewith when the shaft 50 is rocked.

Figure 4:
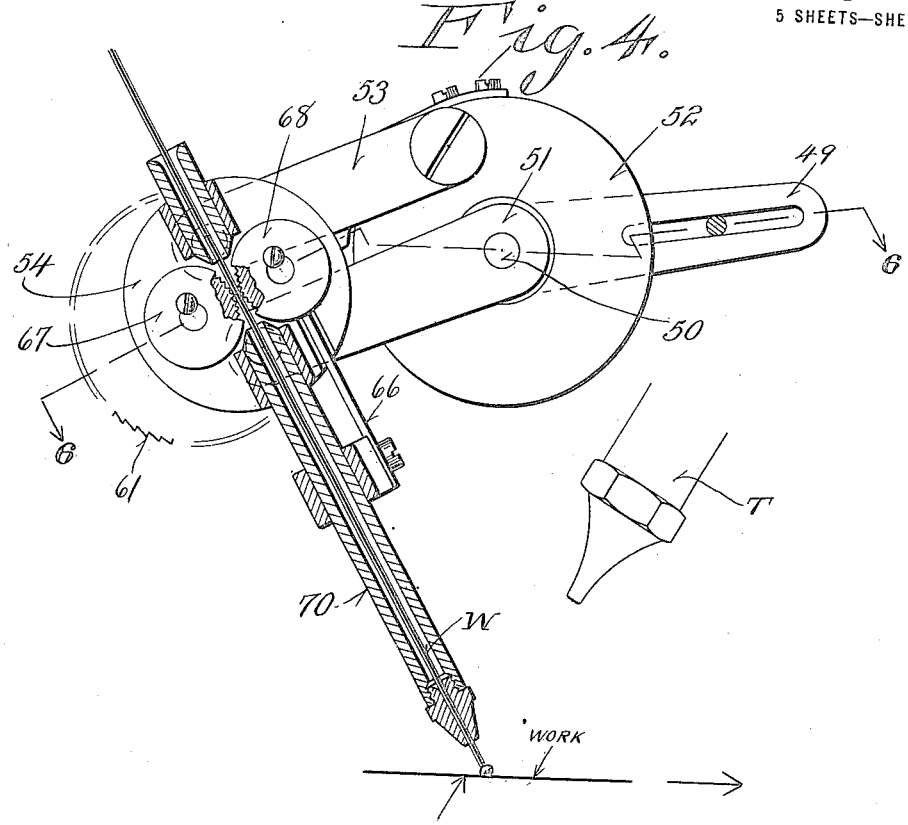
Fig. 4 is a detail elevational view of the mechanism for feeding a wire of soldering material.
Figure 5:
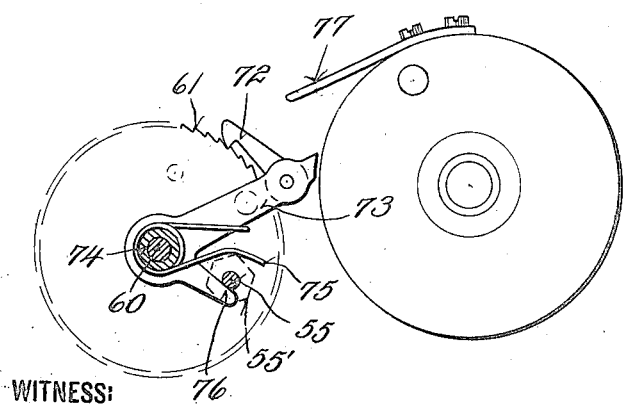
Fig. 5 is a detail view of certain parts of the mechanism shown in the previous figure.

Associated with this machine is an acetylene or oxy-hydrogen torch, or a torch of any preferred nature, the nozzle of which is illustrated in Fig. 4 and designated by the letter T. From this figure it will be noted that said nozzle is disposed at an angle to the work and so positioned that the flame therefrom will strike the latter at a point in a plane passing vertically through the axis of the rock shaft 50. This nozzle being stationary and the work being movable with respect thereto, it will be obvious that the latter will be successively heated as it is brought into the path of the flame.

Assuming that it is desired to braze the seam of a tubular bar for use in a motorcycle frame, and that the same is disposed on the carriage 39, the operation of my improved machine is substantially as follows: The pedal 30 is depressed by the operator's foot to engage the two parts of the clutch 25 for the purpose of causing rotation of the shafts 24 and 34. As hereinbefore mentioned the rotation of the latter shaft shifts the carriage 39 in the direction of the arrow in Fig. 3, this obviously causing the work to be successively brought into the path of the flame from the torch T.

Rotation of the shaft 24 also imparts movement to the beveled gear 36 which in turn oscillates the crank 49, the rock shaft 50 and the crank arm 51. Inasmuch as said crank arm 51 is normally extended laterally toward the left hand side of the machine, oscillation thereof moves the disk carrying plate 54 and associated parts toward and away from the work. In other words the lower end of the guide tube 70 is intermittently brought into close proximity to the work as indicated in Fig. 4 and then moved away therefrom as in Fig. 2. The length of this tube 70 and the manner of connecting it with the crank arm 51 causes its lower end to be almost disposed in the path of the flame from the torch T when in a lowered position, that is to say said end is then slightly out of the vertical plane passing through the axis of the rock shaft 50.

Upon each movement of the disk carrying plate 54 upwardly or away from the work, the lever 73 is brought into engagement with the actuating finger 77 and the ratchet wheel rotated a predetermined amount. As the result of such rotation the gears 62 and 63 are revolved, and with them, the feeding disks 67 and 68. The wire W is thus fed downwardly through the guide 70, this taking place on the movement of the latter away from said work. Thus a new portion of wire will project from the lower end of the guide tube 70 each time the same is moved toward the work, such portion of the wire being brought into the path of the flame from the torch T whereby it is melted and caused to coöperate with the work and braze the seam thereof as is obvious. Only the necessary quantity of soldering material is thus fed to the work, and since the latter is continuously moving through the path of the torch flame, such material will be evenly distributed.

The floating bearing for the feeding disk 68 and its operating gear 63 is provided so that the wire W of different gages may be used without substituting any new parts in the machine. This also allows for any changes in diameter of the same batch of wire or any kinks or uneven places which may occur therein.

After the seam in the work, or so much of it as is desired, is brazed, the operator releases the lever 28 to permit the disengagement of the two parts of the clutch 25; the operation of the machine is thus immediately discontinued and the work may be removed. The carriage 39 having been shifted in one direction a considerable extent is returned to its original position by disengaging the parts of the clutch 34' and moving the same in the desired direction.

I claim:

1. In a machine of the class described, the combination with a torch, a work holding member, the flame from the torch being directed on the work carried by the member, means for providing a relatively rapid uninterrupted intermittent feed of soldering material, or the like, to supply the same in a step by step movement to the piece of work, and means for continuously moving the work holding member and work carried thereby during the rapid, uninterrupted, intermittent feeding of the soldering material.

2. In a machine of the class described, the combination with a torch, a work holding member, the flame from the torch being directed on the work carried by the member, a wire carrying member having a wire of soldering material, or the like, disposed therein, a means for continuously moving the wire carrying member toward and away from the piece of work, and means for continuously moving the work holding member and work carried thereby during the movement of the wire carrying member.

3. In a machine of the class described, the combination with a torch, a work holding member, the flame from the torch being directed on the work carried by the member, a wire carrying member having a wire of soldering material or the like disposed therein, means for providing a relatively rapid uninterrupted intermittent movement of the wire carrying member toward the work, and means for continuously moving the work holding member and work carried thereby during the rapid, uninterrupted, intermittent movement of the wire carrying member.

4. In a machine of the class described, the combination with a torch, a work holding member, the flame from the torch being directed on the work carried by the member, a wire carrying member having a wire of soldering material, or the like, disposed therein, a means for continuously moving the wire carrying member toward and away from the piece of work, means for intermittently feeding the wire outwardly of the carrying member during the movement thereof away from the work, and means for continuously moving the work holding member and work carried thereby during the movement of the wire carrying member and the intermittent feeding of the soldering wire.

5. In a machine of the class described, the combination with a torch, a work holding member, a rock shaft, a crank connected to said shaft, a wire carrying member mounted on the end of the crank and including a feed member, and a pawl and ratchet mechanism, means for oscillating the rock shaft to move the wire carrying member toward and away from the work holding member, and a stationary finger for intermittent engagement by the pawl for operation of said feed member.

6. In a machine of the class described, the combination with a torch, a work holding member, a rock shaft, a crank connected to said shaft, a wire holding member including a carrying plate pivoted to the end of said crank eccentrically thereof, a rocker arm having one end pivoted to said carrying plate eccentrically thereof, the other end being pivoted at a point spaced from said rock shaft, wire feeding means on said carrying plate, and means for actuating the wire feeding means upon movement of said carrying plate.

7. In a machine of the class described, a wire carrying member comprising a guide tube, a disk carrying plate fixed thereon, a pair of wire feeding disks, one being rotatively mounted on said plate, a flexible rod fixed at one end to said guide tube, the other end being disposed adjacent said disk carrying plate and having the other feed disk rotatively mounted thereon, whereby one of said disks may move laterally with respect to the other, and means for rotating said disks.

In testimony that I claim the foregoing I have hereunto set my hand at Milwaukee, in the county of Milwaukee, and State of Wisconsin.

HENRY J. LEWIS.